(12) United States Patent
Oakner et al.

(10) Patent No.: US 9,217,580 B2
(45) Date of Patent: Dec. 22, 2015

(54) HOSE ATTACHMENT DEVICE FOR CLEARING DRAIN LINES

(71) Applicant: MSD Research, Inc., Boca Raton, FL (US)

(72) Inventors: Stuart Oakner, Boca Raton, FL (US); Donna Oakner, Boca Raton, FL (US)

(73) Assignee: MSD Research, Inc., Boca Raton, FL (US)

( * ) Notice: Subject to any disclaimer, the term of this patent is extended or adjusted under 35 U.S.C. 154(b) by 0 days.

(21) Appl. No.: 14/473,506

(22) Filed: Aug. 29, 2014

(65) Prior Publication Data

US 2015/0059868 A1 Mar. 5, 2015

Related U.S. Application Data

(60) Provisional application No. 61/872,138, filed on Aug. 30, 2013.

(51) Int. Cl.

| | |
|---|---|
| *F24F 13/22* | (2006.01) |
| *F24F 13/02* | (2006.01) |
| *B08B 9/027* | (2006.01) |
| *F28G 9/00* | (2006.01) |
| *B08B 9/032* | (2006.01) |
| *F16L 21/03* | (2006.01) |

(52) U.S. Cl.
CPC ............. *F24F 13/222* (2013.01); *B08B 9/027* (2013.01); *F24F 13/02* (2013.01); *B08B 9/0321* (2013.01); *B08B 9/0328* (2013.01); *F16L 21/03* (2013.01); *F24F 2013/227* (2013.01); *F24F 2221/22* (2013.01); *F24F 2221/225* (2013.01); *F28F 2265/22* (2013.01); *F28G 9/00* (2013.01); *Y10T 137/4259* (2015.04)

(58) Field of Classification Search
CPC ............. F24F 13/222; F24F 2221/225; F24F 2013/227; F24F 2221/22; F24F 13/02; B08B 9/0328; B08B 5/02; B08B 3/04; B08B 3/08; B08B 9/027

USPC .......................................................... 137/240
See application file for complete search history.

(56) References Cited

U.S. PATENT DOCUMENTS

| | | | |
|---|---|---|---|
| 1,274,103 A | 7/1918 | Story | |
| 2,645,244 A | 7/1953 | Klickman | |
| 2,921,599 A * | 1/1960 | Fleischman | ............ E03C 1/306 137/240 |
| 3,937,404 A * | 2/1976 | Johnson | .................... B05B 1/14 134/166 C |
| 5,085,244 A * | 2/1992 | Funk | .................... B08B 9/0321 134/102.1 |
| 5,105,504 A * | 4/1992 | Brzoska | .................... A47L 5/14 15/330 |

(Continued)

*Primary Examiner* — Kevin Lee
(74) *Attorney, Agent, or Firm* — Robert M. Downey, P.A.

(57) ABSTRACT

A hose attachment device for use in combination with a source of pressurized gas or liquid for clearing HVACR drain lines. The device includes a cap having an interior cavity extending from an open bottom end that is sized for engaged receipt of an open-ended drain line extension. One embodiment of the device includes a hose extending through the top of the cap and having a fitting at the proximal end of the hose (extending from the top of the cap) that is sized for attachment to the pressurized source. A valve fitting at the distal end of the hose is sized for engaged receipt of a male valve stem, such as a Schrader valve. Another embodiment of the invention includes a valve fitting extending through top of the cap. A further embodiment of the invention includes an upper component and a lower component forming the cap, wherein the upper component is securable to a nozzle of a garden hose and the bottom component is securable to an open-ended drain line extension.

19 Claims, 7 Drawing Sheets

(56) References Cited

U.S. PATENT DOCUMENTS

| | | |
|---|---|---|
| 5,722,458 A | 3/1998 | Potter |
| 6,237,620 B1 * | 5/2001 | Ferguson ................. E03B 7/12 137/209 |
| 6,708,717 B1 * | 3/2004 | Coogle ................. B08B 9/0321 134/166 C |
| 8,479,760 B2 | 7/2013 | Eads |
| 8,985,635 B2 * | 3/2015 | Hurley ................. F24F 13/222 285/179 |

* cited by examiner

HOSE ATTACHMENT DEVICE FOR CLEARING DRAIN LINES

BACKGROUND OF THE INVENTION

1. Field of the Invention

This invention relates to cleaning drain lines and other fluid transfer conduits and, more particularly, to a hose attachment device for introducing a pressurized flow of gas or liquid into a drain line or other conduit in order to clear a clog.

2. Discussion of the Related Art

In various systems and equipment, there is a need to transfer and/or drain liquid from the equipment to a separate location. For example, in air conditioning and refrigeration systems, liquid condensate is directed through a drain line that leads to an appropriate discharge location, such as the exterior of a building. It is not uncommon for these and other types of drain lines to occasionally become partially or completely clogged, resulting in a backup of condensate liquid in the drain line and the collection pan of the HVACR unit. In order to flush clogs and prevent accidental condensate overflows in HVACR condensate drain lines, a pressurized flow of liquid or gas is introduced through one end of the drain line which serves to push debris, residue and blockages through the drain line and out through the opposite end. Hose attachment assemblies having a valve fitting and removable seal plug allow for inline injection of pressurized gas or liquid to flush clogs in an HVACR drain line; however, these attachment devices that are commonly used in the field include multiple parts that can be cumbersome to use and easy to lose.

Considering the limitations and problems associated with existing hose attachment devices, there exists a need for a hose attachment device that allows for quick and easy attachment to a drain line access device or opening for flushing the drain line with a pressurized flow of gas or liquid in order to remove any clogs.

SUMMARY OF THE INVENTION

The present invention is directed to a hose attachment device for use in combination with a source of pressurized gas (e.g., nitrogen) or liquid for clearing HVACR drain lines. The device includes a cap having an open bottom and an interior cavity surrounded by the cap and communicating with the open bottom. An inner surface of the cap, within the interior cavity, is sized for engaged receipt of a drain line extension, such as a ¾" PVC drain line extension. A hose extends through the top of the cap and into the interior cavity. A threaded male fitting at the proximal end of the hose (extending from the top of the cap) is sized for engaged receipt of a female valve stem, such as a Schrader valve. A valve fitting at the distal end of the hose (extending from the interior cavity of the cap) is sized for engaged receipt of a male valve stem, such as a Schrader valve. In operation, the threaded male fitting is attached to an apparatus (e.g., a tank canister or cartridge) and the valve fitting on the distal end is attached to the valve of a drain line access assembly. A pressurized flow of gas or liquid is then released from the apparatus, through the hose of the attachment device and into the drain line. Alternatively, if the drain line access assembly includes an open-ended drain line extension or other access opening, the drain line extension is secured to the hose attachment device by engaged receipt within the interior cavity of the cap, wherein the pressurized flow of gas or liquid is introduced into the drain line through the open end of the extension or like access opening.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION OF THE PREFERRED EMBODIMENT

Referring to the several views of the drawings, the hose attachment device of the present invention for clearing HVACR drain lines 100 is shown and is generally indicated as 10.

Figure 2:
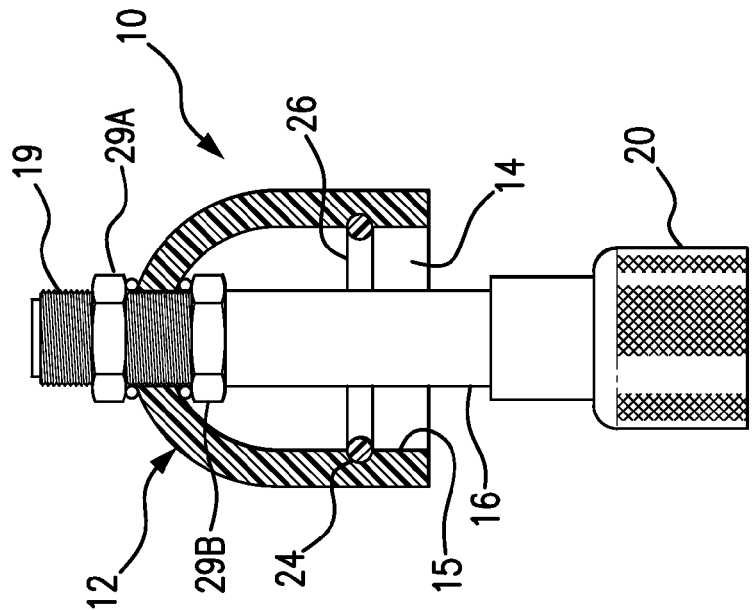
FIG. 2 is a side elevational view, shown in partial cross-section, illustrating an alternative embodiment of the hose attachment device of the present invention.
Figure 1:
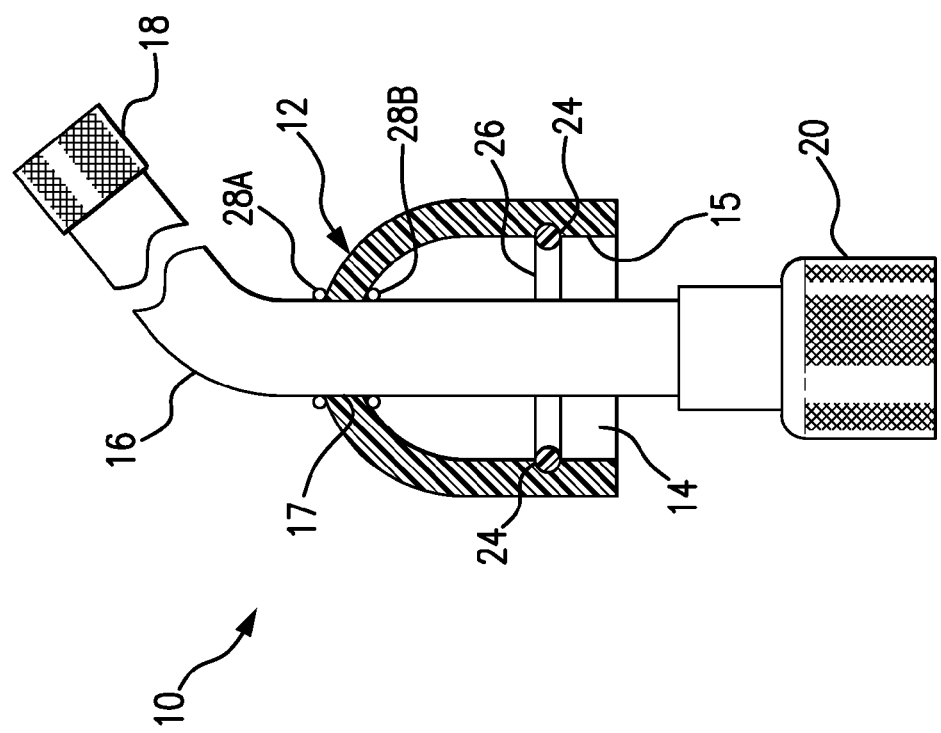
FIG. 1 is a side elevational view, shown in partial cross-section, illustrating the hose attachment device of the present invention.

Referring to FIGS. 1 and 2, the hose attachment device 10 includes a dome-shaped cap 12 having an open bottom end and an interior cavity 14 surrounded by an inner facing wall 15 of the cap 12 and communicating with the open bottom. It is noted that the term "dome-shaped" is not limited to the configuration shown in the drawings and includes any shape and configuration that meets the description herein and serves the same function, such as a flat top cap, all of which are fully contemplated within the spirit and scope of the invention. The open bottom end and the interior cavity 14 of the dome-shaped cap 14 are sized for engaged receipt of a drain line extension 102, such as a ¾" drain line extension made from any known material such as, but not limited to PVC, CPVC or copper. A hose member 16 or other connecting member extends through an opening 17 at the top of the dome-shaped cap 12 and into the interior cavity 14, thereby forming a fluid-flow channel between the proximal and distal ends of the hose member 16. In one embodiment of the device 10, as shown in FIG. 1, a female fitting 18 is provided at the proximal end of the hose member 16 (extending from the top of the dome-shaped cap) and is sized for engaged receipt of a male fitting, such as on a valve of a pressurized tank or canister, that is adapted for delivering a pressurized flow of pressurized gas or liquid therethrough. In another embodiment of the device 10, as shown in FIG. 2, a threaded male fitting 19 extends through opening 17 that is provided for attachment with the female fitting of a hose in connection with the source of pressurized gas or liquid. A valve fitting 20 at the distal end of the hose member 16 (extending from the interior cavity of the dome-shaped cap) is sized for engaged receipt of a male valve stem, such as a Schrader valve, that is in fluid flow communication with a drain line 100.

The inner facing wall 15 of the dome-shaped cap 12, which defines the interior cavity 14, includes a recess 24 extending around the circumference (or perimeter, if a non-circular surface) of the inner facing wall 15. The recess 24 is sized for engaged receipt of an o-ring 26 (or other gasket member) for securing the o-ring 26 therein. The o-ring 26 is sized and configured to provide frictional receipt of a drain line extension 102 therethrough to tightly secure the drain line extension 102 within the interior cavity 14 of the dome-shaped cap 12 for the purpose of producing a liquid tight seal.

Stopper rings 28A and 28B are attached to the hose member 16 at the top outer surface of the dome-shaped cap 12 and at the top of the inner facing surface 15 within the interior cavity 14 of the dome-shaped cap 12, respectively. The stopper rings 28A and 28B are provided for producing a liquid tight seal and preventing vertical movement of the hose member 16 through the opening 17 of the dome-shaped cap 12. Additionally, as shown in FIG. 2, hex nuts 29A and 29B may be also attached or releasably secured at the top outer surface of the dome-shaped cap 12 and at the top of the inner facing surface 15 within the interior cavity 14 of the cap 12, respectively, for preventing vertical movement of the hose member 16 through the opening 17 of the cap 12.

Figure 3:
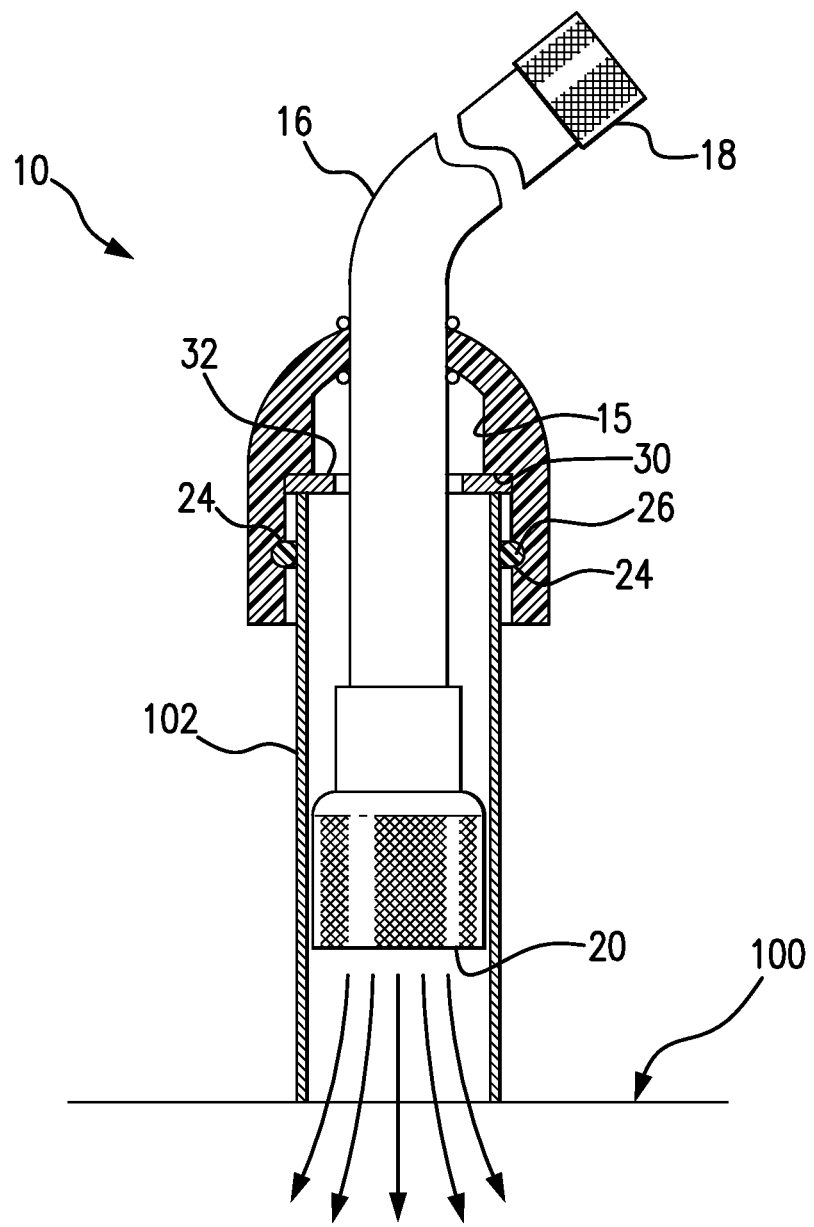
FIG. 3 is a side elevational view, shown in partial cross-section, illustrating the hose attachment device of the present invention secured to an open-ended drain line extension or like access opening of a drain line access assembly.

Referring to FIG. 3, another embodiment of the hose attachment device 10 is shown, wherein the inner facing wall 15 of the cap 12 includes an annular shoulder 30 and a gasket 32 secured thereto. The gasket 32 is configured for sealed abutment with the end of a drain line extension 102, wherein the drain line extension 102 is secured to the hose attachment device 10 by engaged receipt within the interior cavity 14 of the cap 12. In operation, the pressurized flow of gas or liquid enters the drain line extension 102 through the valve fitting 20, which is directed into the drain pipe 100. Each embodiment of the hose attachment device 10 may include either or both of the o-ring 26 and gasket 32 for creating a liquid tight seal between the hose attachment device 10 and the drain line extension 102.

Figure 4:
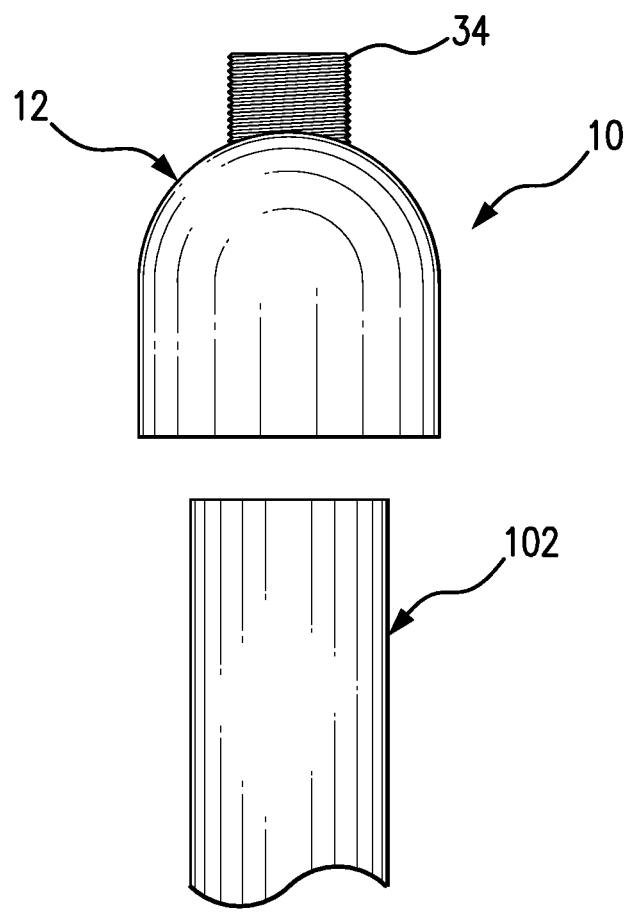
FIG. 4 is an exploded view showing a further embodiment of the hose attachment device of the present invention and an open-ended drain line extension pipe.
Figure 5A:
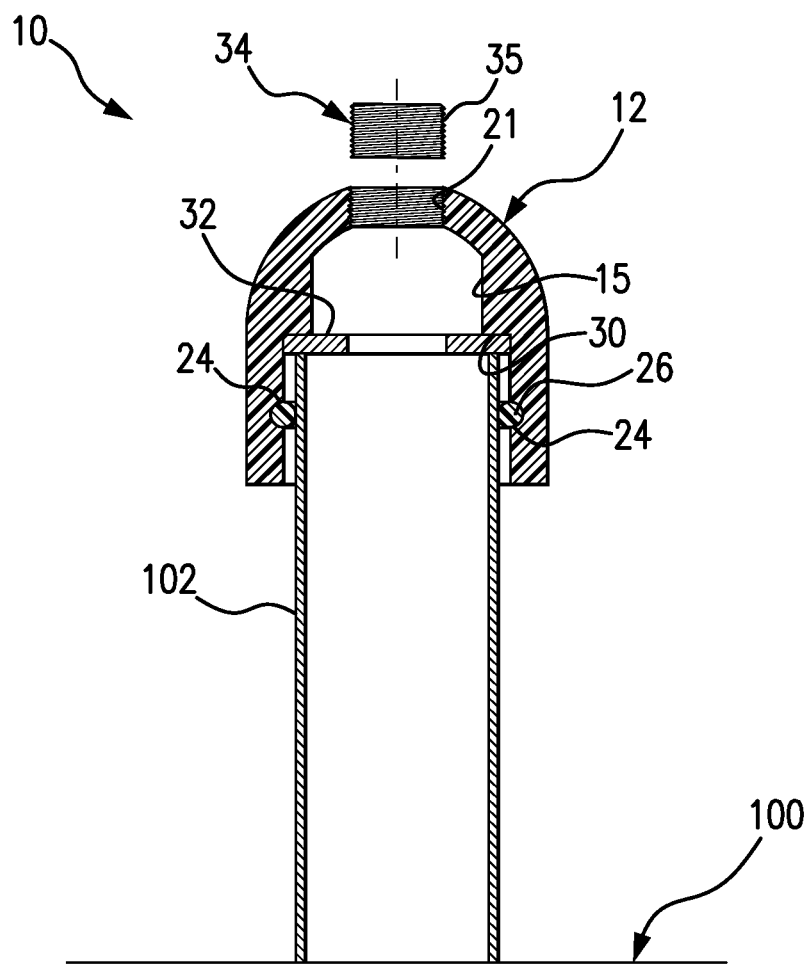
FIG. 5A is a side elevational view, shown in partial cross-section, illustrating the hose attachment device taken from FIG. 4 secured to an open-ended drain line extension or like access opening of a drain line access assembly.
Figure 5B:
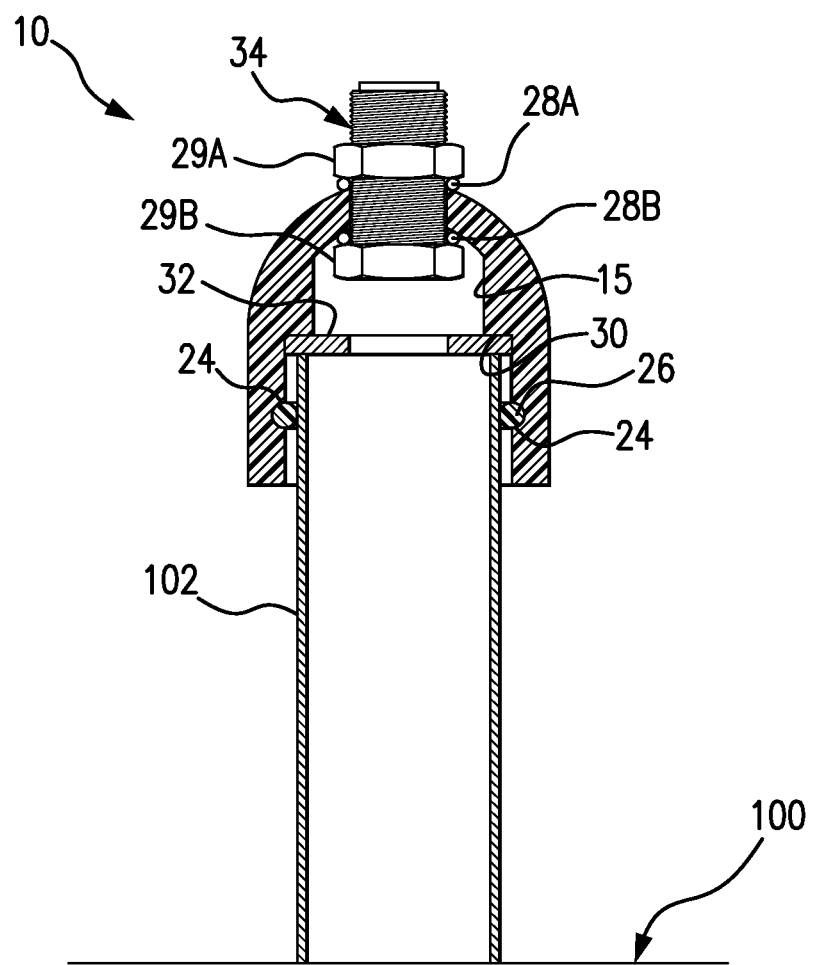
FIG. 5B is a side elevational view, shown in partial cross-section, illustrating a further embodiment of the hose attachment device taken from FIG. 4 secured to an open-ended drain line extension or like access opening of a drain line access assembly.

Referring to FIGS. 4-5B, another embodiment of the hose attachment device 10 is shown, wherein a Schrader valve 34 extends through opening 17 on the cap 12. The Schrader valve 34 is used as a connection point for introducing a pressurized flow of air into the drain pipe 100 or drain line extension 102 to which the hose attachment device 10 is secured. Referring to FIG. 5A, the threaded outer surface 35 of Schrader valve 34 is screwed into the opening of cap 12 and creates a liquid tight, threaded seal with the threaded inner surface 21 of the opening. Referring to FIG. 5B, another embodiment is shown wherein stopper rings 28A and 28B and hex nuts 29A and 29B are secured at the top outer surface of the cap 12 and at the top of the inner facing surface 15 within the interior cavity 14 of the cap 12, respectively, for creating a liquid tight seal and preventing vertical movement of the hose member 16 through the opening 17 of the cap 12.

Figure 6:
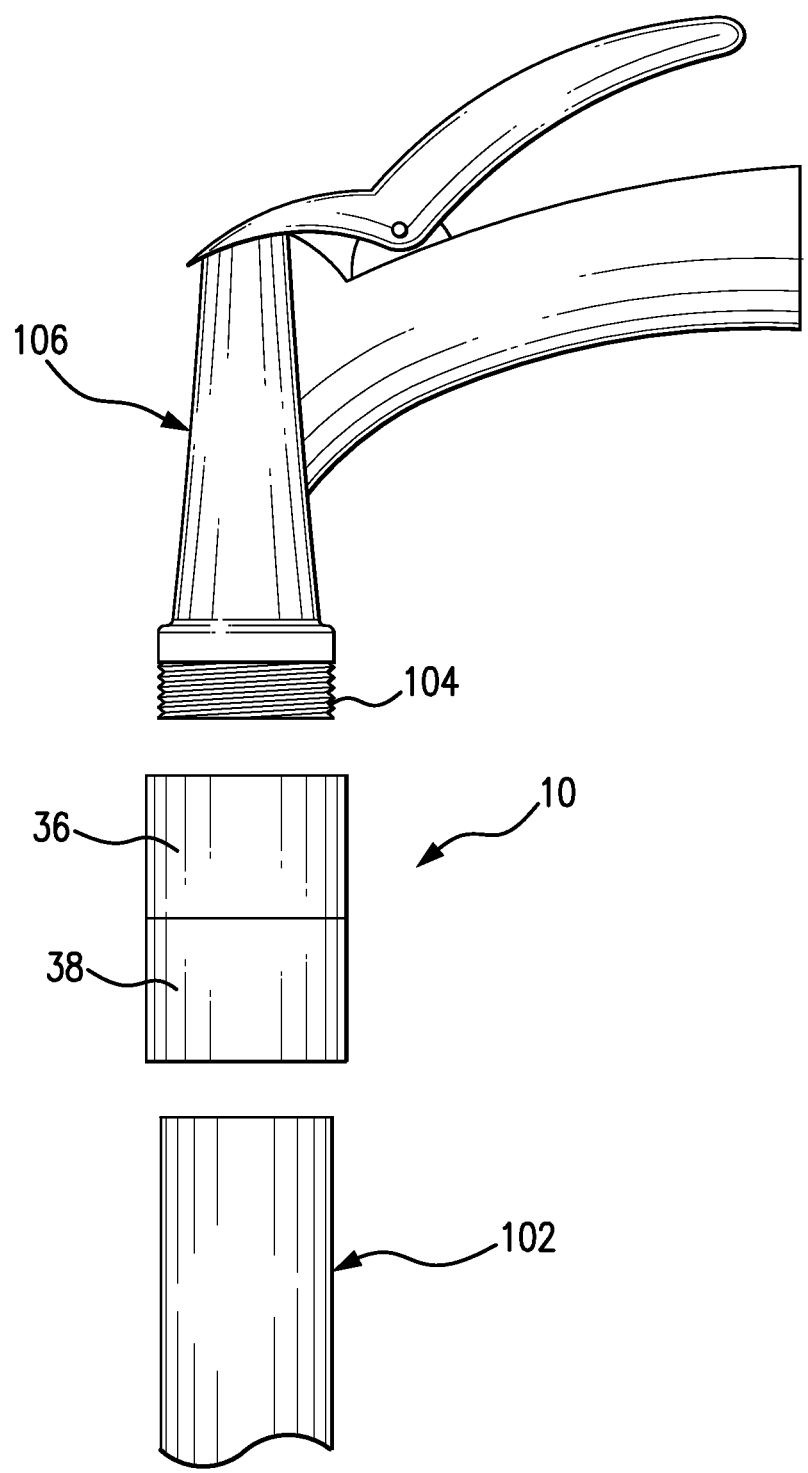
FIG. 6 is an exploded view showing a further embodiment of the hose attachment device of the present invention, a garden hose, and an open-ended drain line extension pipe.
Figure 7:
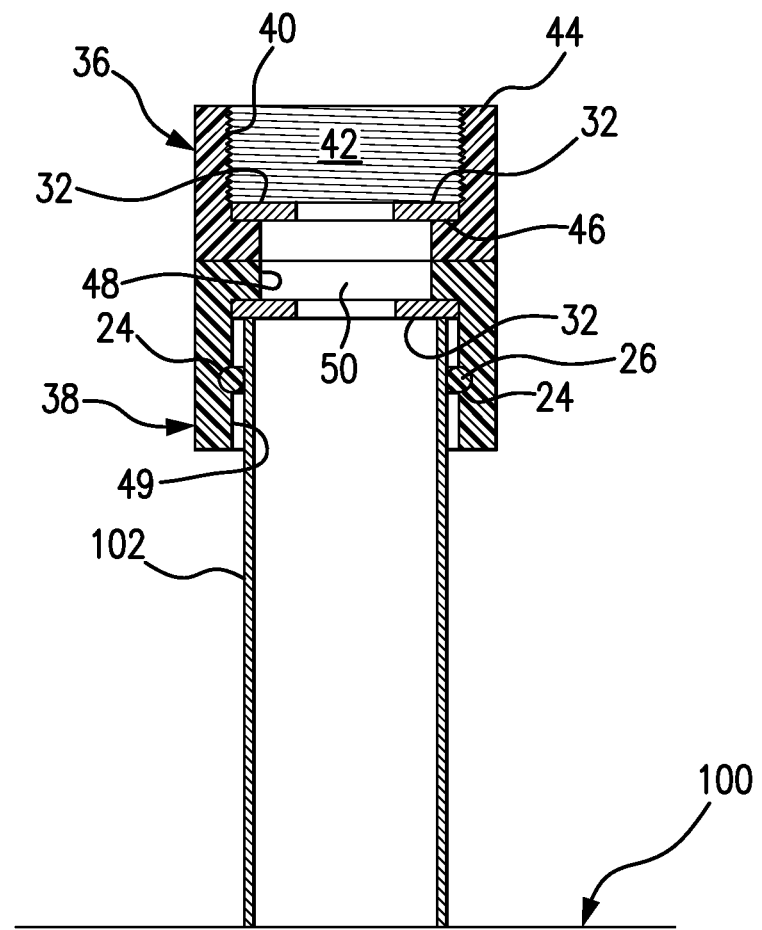
FIG. 7 is a side elevational view, shown in partial cross-section, illustrating the hose attachment device taken from FIG. 6 secured to an open-ended drain line extension pipe.

Referring to FIGS. 6 and 7, another embodiment of the hose attachment device 10 is shown, wherein the device 10 includes an upper component 36 and a lower component 38. The upper component 36 includes a threaded inner surface 40 surrounding inner cavity 42 at opening 44 that is sized and configured for threaded, engaged receipt of a threaded nozzle 104 of a garden hose 106 or other pressurized liquid source. A gasket 32 at annular shoulder 46 serves to produce a liquid tight seal between the threaded nozzle 104 and inner cavity 42. The lower component 38 effectively serves the same purpose as cap member 12 and includes inner facing surface 49 surrounding inner cavity 50, which is sized and configured for engaged receipt of a drain line extension 102. In operation, pressurized fluid flows from the garden hose 106 into the inner cavity 42 of upper component 36 and through opening 48 of the lower component 38. As shown in FIG. 7, the lower component 38 may include both an o-ring 26 in recess 24 and a gasket 32 at annular shoulder 30 for creating a liquid tight seal between the hose attachment device 10 and the drain line extension 102. Conversely, the lower component 38 may include either one of the o-ring 26 or gasket 32. In a preferred embodiment, the upper component 36 is rotatable relative to the lower component 38 for tightening the threaded attachment between the threaded nozzle 104 of garden hose 106 and the threaded inner surface 40 of the upper component 36.

While the cap 12 has been shown and described as being dome-shaped, the cap 12 may be provided in alternative forms. For instance, the cap 12 may be provided as a flat top cap 12.

While the present invention has been shown and described in accordance with preferred and practical embodiments thereof, it is recognized that departures from the instant disclosure are contemplated within the spirit and scope of the present invention.

What is claimed is:

1. A device for attachment to a source of pressurized gas or liquid and a drain line or drain line extension for clearing the drain line, said device comprising:

a cap having an outer facing surface and an inner facing wall surface surrounding an interior cavity, said interior cavity extending between a top end and an open bottom end of said cap and being sized for engaged receipt of a portion of a drain line or drain line extension through the open bottom end of said cap, and wherein said interior cavity is sized and configured for producing a liquid tight seal between the inner facing wall surface of said cap and an outer surface of the drain line or drain line extension;

a connecting member extending through an opening on the top end of said cap member, said connecting member including an open-ended proximal end for attachment to the source of pressurized gas or liquid and an open-ended distal end, and wherein a fluid-flow channel extends between the open-ended proximal end and open-ended distal end of said connecting member; and wherein introduction of pressurized gas or liquid through the open-ended proximal end of said connecting member causes a flow of pressurized gas or liquid to be delivered through the fluid-flow channel and through the open-ended distal end of said connecting member and into the drain line or drain line extension for clearing the drain line or drain line extension.

2. The device as recited in claim 1 wherein said connecting member is a hose member.

3. The device as recited in claim 1 wherein said connecting member is a valve fitting.

4. The device as recited in claim 1 wherein said connecting member comprises:

an upper component secured to the outer facing surface of said cap, and said upper component having an open top end and an open bottom end with a threaded inner surface extending therebetween and surrounding an inner cavity that is sized and configured for threaded, engaged receipt of a threaded nozzle of the source of pressurized gas or liquid.

5. The device as recited in claim 1 further comprising a gasket member on the inner facing surface of said cap, and said gasket member being sized and configured to provide frictional force against the outer surface of the drain line or drain line extension for producing a liquid tight seal.

6. The device as recited in claim 1 further comprising at least one stopper ring on an outer surface of said connecting member adjacent to the opening on the top end of said cap, and said stopper ring being structured and disposed for creating a liquid tight seal between the outer surface of said connecting member and said cap at the opening of said cap.

7. The device as recited in claim 1 wherein the inner facing surface of said cap includes an annular shoulder that is sized and configured for coming into congruent abutment against an end portion of the drain line or drain line extension.

8. The device as recited in claim 7 further comprising a gasket on the inner facing wall surface at the annular shoulder of said cap, and said gasket being structured and disposed for creating a liquid tight seal between the inner facing wall surface of said cap and the outer surface of the drain line or drain line extension.

9. A device for attachment to a source of pressurized gas or liquid for clearing a drain line, said device comprising:
 a cap having an outer facing surface and an inner facing wall surface defining an interior cavity, said interior cavity extending between a top end and an open bottom end of said cap and being sized for engaged receipt of a portion of a drain line through the open bottom end of said cap, and wherein the open bottom end is sized and configured for passage of the drain line therethrough and for producing a liquid tight seal between the inner facing wall surface of said cap and the drain line;
 a valve fitting extending through an opening on the top end of said cap, said valve fitting including a proximal end for attachment to the source of pressurized gas or liquid and a distal end; and
 wherein introduction of pressurized gas or liquid to said valve fitting at the proximal end causes a flow of pressurized gas or liquid to be delivered through said valve fitting and into the drain line for clearing the drain line.

10. The device as recited in claim 9 further comprising a gasket member on the inner facing surface of said cap, and said gasket member being sized and configured to provide frictional force against an outer surface of the drain line for producing a liquid tight seal.

11. The device as recited in claim 10 further comprising at least one nut member on an outer surface of said valve fitting adjacent to the opening on the top end of said cap, and said nut member being sized and configured for being rotated in one direction for tightening a seal between said gasket member and said cap.

12. The device as recited in claim 9 further comprising at least one stopper ring on an outer surface of said valve fitting adjacent to the opening on the top end of said cap, and said stopper ring being structured and disposed for creating a liquid tight seal between the outer surface of said valve fitting and said cap at the opening of said cap.

13. The device as recited in claim 9 wherein the inner facing surface of said cap includes an annular shoulder that is sized and configured for coming into congruent abutment against an end portion of the drain line.

14. The device as recited in claim 13 further comprising a gasket on the inner facing surface at the annular shoulder of said cap, and said gasket being structured and disposed for creating a liquid tight seal between the inner facing surface of said cap and an outer surface of the drain line.

15. The device as recited in claim 9 wherein a threaded inner wall defines the opening on the top end of said cap and said valve fitting includes a threaded outer surface, and said threaded inner wall on said cap being sized and configured for threaded, engaged receipt of the threaded outer surface of said valve fitting to produce a liquid tight seal.

16. A device for attachment to a source of pressurized gas or liquid for clearing a drain line, said device comprising:
 a lower component having an outer facing surface and an inner facing surface defining an interior cavity, said interior cavity extending between an open top end and an open bottom end of said lower component and being sized for engaged receipt of a portion of a drain line through the open bottom end of said lower component, and wherein the open bottom end is sized and configured for passage of the drain line therethrough and for producing a liquid tight seal between the inner facing surface of said lower component and the drain line;
 an upper component secured to the outer facing surface of the top end of said lower component, said upper component having an open top end and an open bottom end with a threaded inner surface extending therebetween and surrounding an inner cavity that is sized and configured for liquid tight, threaded receipt and connection of a threaded nozzle of a source of pressurized gas or liquid, and wherein a fluid-flow channel extends between the open top end of said upper component and the open bottom end of said lower component; and
 wherein introduction of pressurized gas or liquid through the open top end of said upper component causes a flow of pressurized gas or liquid to be delivered through the fluid-flow channel and through the open bottom end of said lower component and into the drain line for clearing the drain line.

17. The device as recited in claim 16 wherein said upper component is configured to rotate relative to said lower component for tightening the threaded connection between the threaded nozzle of the source of pressurized gas or liquid and the threaded inner surface of said upper component.

18. The device as recited in claim 16 wherein the inner facing surface of said lower component includes an annular shoulder that is sized and configured for coming into congruent abutment against an end portion of the drain line.

19. The device as recited in claim 18 further comprising a gasket on the inner facing surface at the annular shoulder of said lower component, and said gasket being structured and disposed for creating a liquid tight seal between the inner facing surface of said lower component and the outer surface of the drain line.

* * * * *